United States Patent [19]

Brewer et al.

[11] Patent Number: 5,288,434
[45] Date of Patent: Feb. 22, 1994

[54] HEPA FILTER DISSOLUTION PROCESS

[75] Inventors: Ken N. Brewer, Arco; James A. Murphy, Idaho Falls, both of Id.

[73] Assignee: The United States of America as represented by the United States Department of Energy, Washington, D.C.

[21] Appl. No.: 933,144

[22] Filed: Aug. 21, 1992

[51] Int. Cl.$^5$ .................................... G21F 9/00
[52] U.S. Cl. .......................... 252/626; 134/3; 210/769; 210/771
[58] Field of Search .............. 252/626, 632; 134/3, 134/42; 210/771, 769, 407

[56] References Cited

U.S. PATENT DOCUMENTS

| | | | |
|---|---|---|---|
| 4,715,992 | 12/1987 | Snyder et al. | 252/628 |
| 4,772,430 | 9/1988 | Sauda et al. | 252/628 |
| 4,857,211 | 8/1989 | Nineuil et al. | 210/797 |
| 4,995,916 | 2/1991 | Meikrantz et al. | 134/22.16 |
| 5,085,709 | 2/1992 | Morris et al. | 134/3 |

Primary Examiner—Donald P. Walsh
Assistant Examiner—Ngoclan T. Mai
Attorney, Agent, or Firm—James W. Weinberger; Hugh Glenn; William R. Moser

[57] ABSTRACT

A process for dissolution of spent high efficiency particulate air (HEPA) filters and then combining the complexed filter solution with other radioactive wastes prior to calcining the mixed and blended waste feed. The process is an alternate to a prior method of acid leaching the spent filters which is an inefficient method of treating spent HEPA filters for disposal.

26 Claims, 4 Drawing Sheets

HEPA FILTER DISSOLUTION PROCESS

CONTRACTUAL ORIGIN OF THE INVENTION

The United States has rights in this invention pursuant to Contract No. DE-AC07-84ID12435 between the U.S. Department of Energy and Westinghouse Idaho Nuclear Company, Inc.

FIELD OF THE INVENTION

This invention relates to a process for dissolution and disposal of filters for use in hot cells and hazardous or other radioactive nuclear applications. In particular, a HEPA (high-efficiency particulate air) filter used to clean off-gas effluents is dissolved in an acid, complexed with chemicals, mixed with other nuclear wastes, and then solidified in a fluidized bed at 500° C.

BACKGROUND OF THE INVENTION

Filters are used in hot cells or areas in which work is performed on equipment or substances that produce significant levels of radiation that may be threatening to humans. For instance, in hot cells, the work that is done is performed by electromechanical manipulators, master-slave manipulators, and overhead cranes, operated from remote locations by humans who are shielded from the radiation. Air in hot cells is circulated and filtered to prevent the release of radioactive materials to the environment. It is also necessary to filter the gases emanating from process equipment in hot cells. Such air or other gas is filtered to remove particulate matter that may be radioactive or hazardous. The filters and their housings are thus located in the hot cell and are radioactive or contaminated with radioactive materials or other hazardous elements.

A method of recovering hazardous wastes collected on a phenolic resin filter used to filter fluid systems is disclosed in U.S. Pat. No. 4,995,916 issued Feb. 26, 1991. This method dissolves the phenolic fiber material and particulate contained in the filter cartridge by 8-12 molar nitric acid at temperatures of 160°-190° F. This patent is assigned to the U.S. Department of Energy.

HEPA filters are disclosed in U.S. Pat. No. 4,773,922 issued on Sept. 12, 1988, and also assigned to the U.S. Department of Energy.

A HEPA filter or complex of filters must be removed and replaced when particulate buildup creates an excessive pressure drop in the off-gas system. After replacement, the used filters require some form of regulated disposal method that prevents spread of the radioactive or hazardous particulates. Spent HEPA filters from nuclear facilities are typically classified as high-level, transuranic (TRU), and mixed waste, which is impossible to dispose of without processing.

Because of the difference of the filter media from the HEPA filter of the present process, the above phenolic filter process is not appropriate for the HEPA filter dissolution. HEPA filter materials are primarily silicon ($SiO_2$), boron ($B_2O_3$), aluminum oxide ($Al_2O_3$), and KEVLAR TM.

As an alternative, a HEPA filter leach system may be used to "clean" the filter element; however, leaching tests of these HEPA filters in some cases has failed to remove enough mercury for the filters to meet EPA toxic concentration leach procedure (TCLP) test limits. Accordingly, it would be desirable to have an alternative to leaching. The present invention, filter media dissolution in an HF mixture, has been developed as a disposal method.

SUMMARY OF THE INVENTION

A process is disclosed for dissolving and calcining a HEPA filter:

baking the HEPA filter at 500°-550° C. for about 3 hours;

dissolving the HEPA filter media in a hydrofluoric (HF) acid solution forming an HF/filter solution;

complexing the HF/filter solution with an aluminum nitrate ($AlNO_3$) solution forming a complexed filter waste solution;

mixing the complexed filter waste solution with a radioactive solution, forming a complexed filter/radioactive waste solution;

performing a second complexing on the complexed filter/radioactive waste solution by addition of calcium nitrate ($Ca(NO_1)_2$);

forming a blended feed solution containing the filter waste solution, sodium waste, and fluorinel waste such that the ratio of fluorinel:Na waste is equal to or greater than 5.5:1; and then calcining the blended feed solution, thereby forming a calcined particulate and fines.

Other objects, advantages, and capabilities of the present invention will become more apparent as the description proceeds.

DETAILED DESCRIPTION OF THE INVENTION

Figure 1:
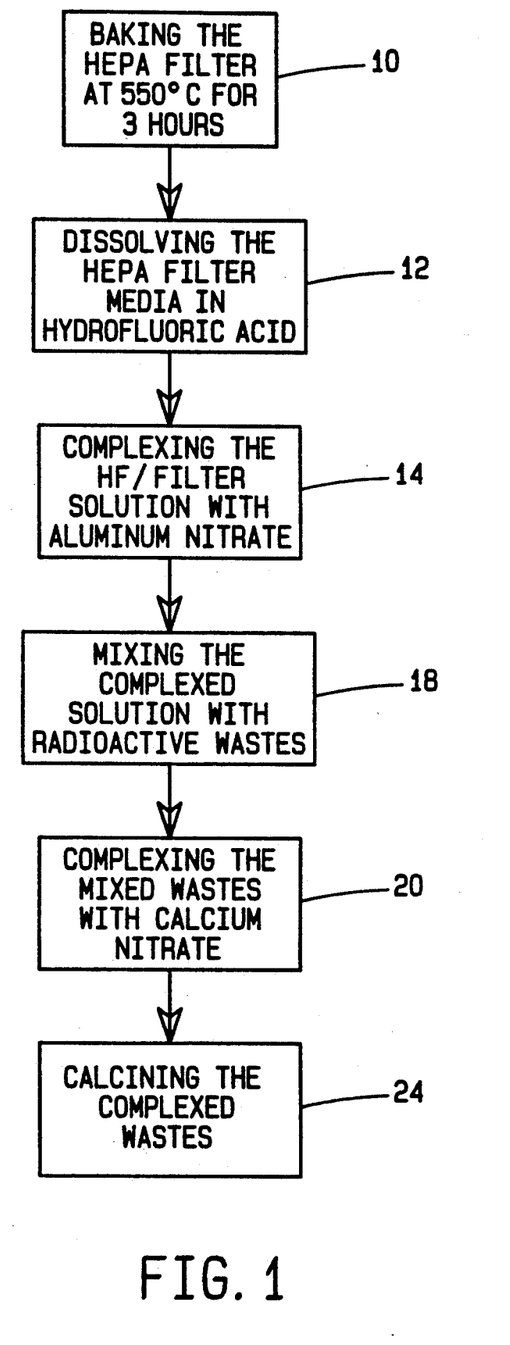
FIG. 1 is a flow chart of the present process.

FIG. 1 discloses the inventive process for dissolving and ultimately calcining the blended and complexed radioactive wastes.

The first step 10 is performed in an oven to decompose the KEVLAR TM which comprises between 3-6% by weight of the filter media. Initial tests on filter dissolution showed that complete dissolution of the media was not occurring and 25% of the total undissolved solids remaining after HEPA filter dissolution were identified as KEVLAR TM. KEVLAP TM is an aromatic polyamide fiber of great strength. In this media, the fibers are light and uniform, having a diameter of 0.0007 inches and a length of 0.25 inches. Laboratory experiments show that KEVLAR TM is converted from a solid to a gas (avoiding the melting phase) at 500° C. KEVLAR TM can be eliminated by baking the filter at about 550° C. for about 3 hours prior to the dissolution. The glass in the filter media begins to melt between 600° and 700° C., therefore a temperature below 550° C. is used.

Extreme caution has to be taken during this baking step because the sealants used to bind the media to the housing are flammable. Fires can be avoided by keeping the oven door shut during the baking process and allowing the sealants to cool in the oven prior to their removal. An option that would eliminate the possibility of a fire is to dissolve the media, filter out the undissolved solids, and then bake the filter, having removed; the objectionable sealants.

After the baking step 10, the HEPA filter media is dissolved in hydrofluoric (HF) acid as in step 12. An initial dissolution in 2M HF for one hour at 70° C. dissolves 90% of the filter media. The dissolution is completed by performing a second dissolution in 2M HF acid at 25° C. for 12 hours. The free HF at the end of this reaction is less than 0.07 molar.

This two-step process has two advantages: (1) the silicon sealants used to bind the media are dissolved, thus reducing the possibility of the remaining filter housing being a hazardous waste due to the presence of environmentally toxic metals on the sealants; and (2) the filter media is 100% dissolved. The preferred ratio of F:Si is about 7:1. A lower ratio causes a gel from $SiO_2$ formation, and a higher ratio will cause formation of metal salt precipitates, such as $AlF_3$, $MgF_2$, $NaF_2$, and $CaF_2$ etc.

The composition of the HEPA filter media is as follows: Major Components: $SiO_2$, 57-63% wt %; $B_2O_3$, 9-11% wt %; $Al_2O_3$, 5-7% wt %; $Na_2O$, 9-12% wt %; and KEVLAR TM, 3-6% wt %, with a total of 74-87% wt %. Minor Components: Mg, Na, Ca, Zn, and Ba: 13-26% wt %.

After dissolution of the filter media, the metal filter housing can be discarded as non-hazardous low level radioactive waste.

The next step 14 in the process is to complex the hydrofluoric acid and filter (HF/filter) solution with aluminum nitrate 2.2M $AlNO_3$. A complex or coordination compound is a compound formed by the union of a metal ion (usually a transition metal) with a nonmetallic ion or molecule called a ligand or complexing agent. The ligand may be either positively or negatively charged (such ions as Cl or $NH_2NH_3^+$) or it may be a molecule of water or ammonia.

This step is performed in order to complex the excess HF with a metal, i.e., Al, thereby reducing the corrosive action of free HF on system piping and components. The chemical equations for these steps are:

(primary HF reaction)

(additional species in existence)

$$nHF + Al(NO_3)_3 \longrightarrow AlF^{+3-n} + nHNO_3 \quad (3)$$

In equation (1), $SiF_4$ is favored when excess HF is present. When HF is depleted, $SiO_2$ reforms as silica gel. Over complexing in equation (3), i.e., adding excess $Al(NO_3)_3$ to the HF/filter solution, causes a silica gel to form in the HF/filter solution from the reversal of equation (1).

Figure 2:
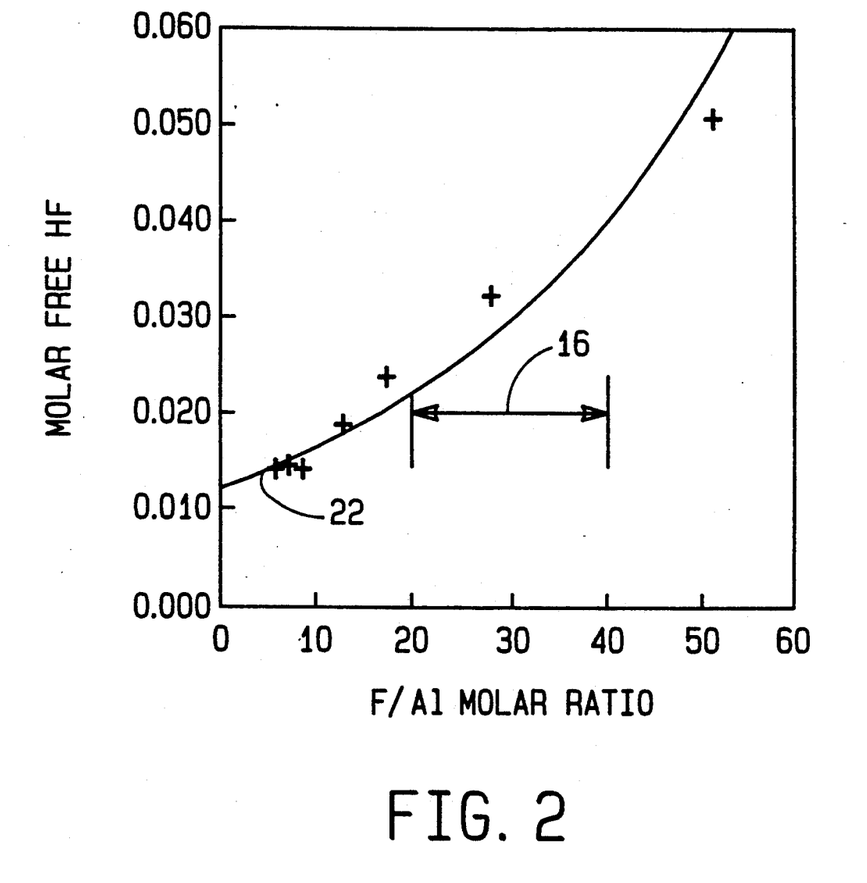
FIG. 2 is a graph of hydrogen fluoride molarity at 23.5° C. versus fluoride-to-aluminum molar ratio.

It has been determined that the preferred F:Al molar ratio is 20:1 to 40:1 in order to maintain a low enough free HF concentration for corrosion control and at the same time provide a high enough free HF to maintain all of the Si in a form $SiF_4$ instead of $SiO_2$ which forms the silica gel. This range is shown in FIG. 2 at 16. FIG. 2 is a graph of free HF molarity at 23.5° C. versus the fluoride-to-aluminum molar ratio. Significant gel formation occurs in zone 22. This figure shows the preferred operating range and the associated HF at 0.012 to 0.026 as controlled by the $AlNO_3$ and HF molar concentration used.

Figure 3:
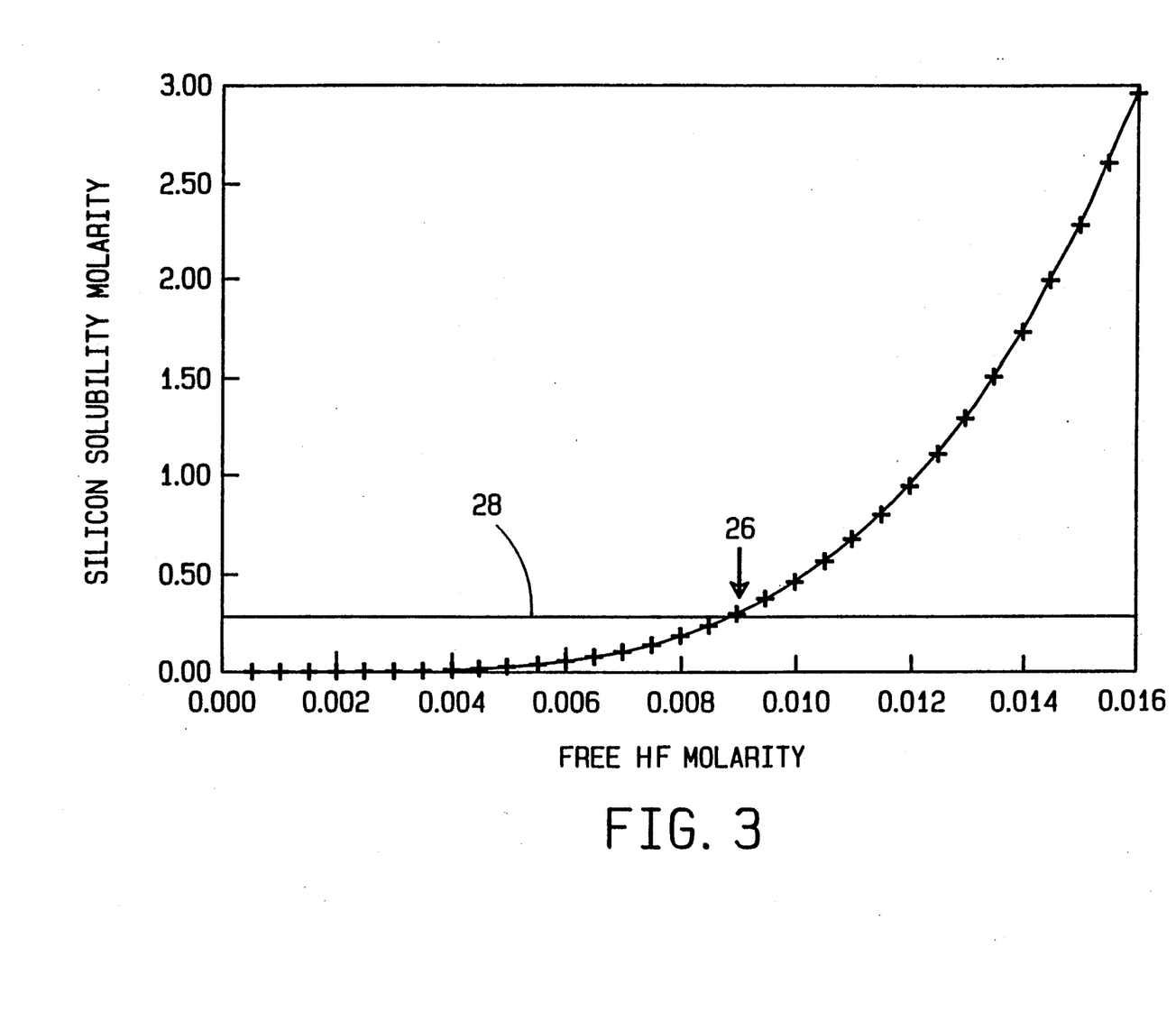
FIG. 3 is a graph of silicon solubility as a function of uncomplexed free HF molarity.

The laboratory data of FIG. 2 were compared to thermodynamic data where silica solubility, as $SiF_4$, was evaluated with respect to the free HF molarity. The free HF molarity was measured by the titanium electrode in this lab test. The calculated solubility of silicon in HF in FIG. 3 shows that silica gel, $SiO_2$, would begin to form when free HF molarity was less than 0.009 molar, as at 26. The FIG. 2 data agree with the theoretical prediction as gel formation was observed between 0.009 and 0.012 molar fee HF. FIG. 3 shows the function of silicon solubility with respect to the free HF molarity. Horizontal line 28 indicates that the silicon concentration in two molar HF of the ratio F:Si is 7:1.

Mixing the HF/filter solution with radioactive wastes, step 18, is performed next. The radioactive wastes consist of a first mixture of HF, zirconium (Zr), and nitric acid called "fluorinel", a fuel rod dissolution waste product, and a second radioactive waste generally described as a "sodium waste". The typical composition of these wastes are given in Table I below.

TABLE I

COMPOSITION OF WASTES AND BLEND USED IN RUN

| Constituent | Fluorinel Waste | Sodium Waste | Complexed HEPA Solution | 4.85:1:1.62 Blended Feed | |
|---|---|---|---|---|---|
| | | | | Before $Ca(NO_3)_2$ Addition[a] | After $Ca(NO_3)_2$ Addition[b] |
| $H^+$ ($M^a$) | 1.81 | 1.60 | 4.37 | 2.34 | 1.96 |
| Al(M) | 0.32 | 0.70 | 1.40 | 0.61 | 0.58 |
| Zr(M) | 0.43 | | | 0.28 | 0.25 |
| B(M) | 0.15 | 0.050 | 0.39 | 0.19 | 0.15 |
| Na(M) | | 2.10 | | 0.28 | 0.33 |
| K(M) | | 0.30 | | 0.040 | 0.041 |
| Cd(M) | 0.086 | | | 0.040 | 0.041 |
| Ca(M) | | 0.090 | | 0.012 | 1.84 |
| Si(M) | | | 0.20 | 0.043 | 0.057 |
| $NO_3$(M) | 2.37 | 6.00 | 4.20 | 3.25 | 7.60 |
| $So_4$(M) | 0.049 | 0.070 | | 0.041 | 0.041 |
| F(M) | 2.86 | 0.040 | 4.37 | 2.81 | 2.56 |
| Cl (μg/ml) | | 1775.00 | | 500.00 | 565.00 |
| Sp. Gr. | | | | | 1.390 |

TABLE I-continued
COMPOSITION OF WASTES AND BLEND USED IN RUN

| Constituent | Fluorinel Waste | Sodium Waste | Complexed HEPA Solution | 4.85:1:1.62 Blended Feed | |
|---|---|---|---|---|---|
| | | | | Before Ca(NO$_3$)$_2$ Addition[a] | After Ca(NO$_3$)$_2$ Addition[b] |
| UDS (g/L) | | | | | 138.00 |

Notes:
[a]Theoretical composition of blend.
[b]Composition based on analyses of blend.

The above blended feed contains 4.85 parts fluorinel to 1.00 part HF/filter solution to 1.62 sodium waste. In this test run, the HEPA filter had not been pre-baked to remove the Keylar ™.

Long-term storage tests have shown that when using an over-complexed HEPA solution, 0 to 0.026 g of gel per liter of complexed HEPA waste will form in a fluorinel:HEPA waste blend ratio of 32:1 or larger. However, these wastes would be compatible at any blend ratio if the HEPA waste was not over-complexed prior to blending. Long-term storage is a requirement of the HEPA filter solution. The dissolution/complexing process changes the equilibrium to match the fluorinel waste so that mixing the waste will not substantially change the stability of the mixed solution. By matching the fluorinel waste, the process will allow one part of HEPA waste to be mixed with as little as 5.5 parts of fluorinel waste.

A second complexing step 20 is then performed prior to calcination by adding calcium nitrate (Ca(NO$_3$)$_2$) to result in a calcium-to-fluoride mole ratio of about 0.70:1 in the complexed filter/radioactive waste solution. A ratio of about 0.70:1 is necessary to control fluoride and chloride volatility in the calcining step. The equation of this step is:

$$Ca(NO_3)_2 + 2F^- \rightarrow CaF_2 + 2NO_3^-.$$

Figure 4:
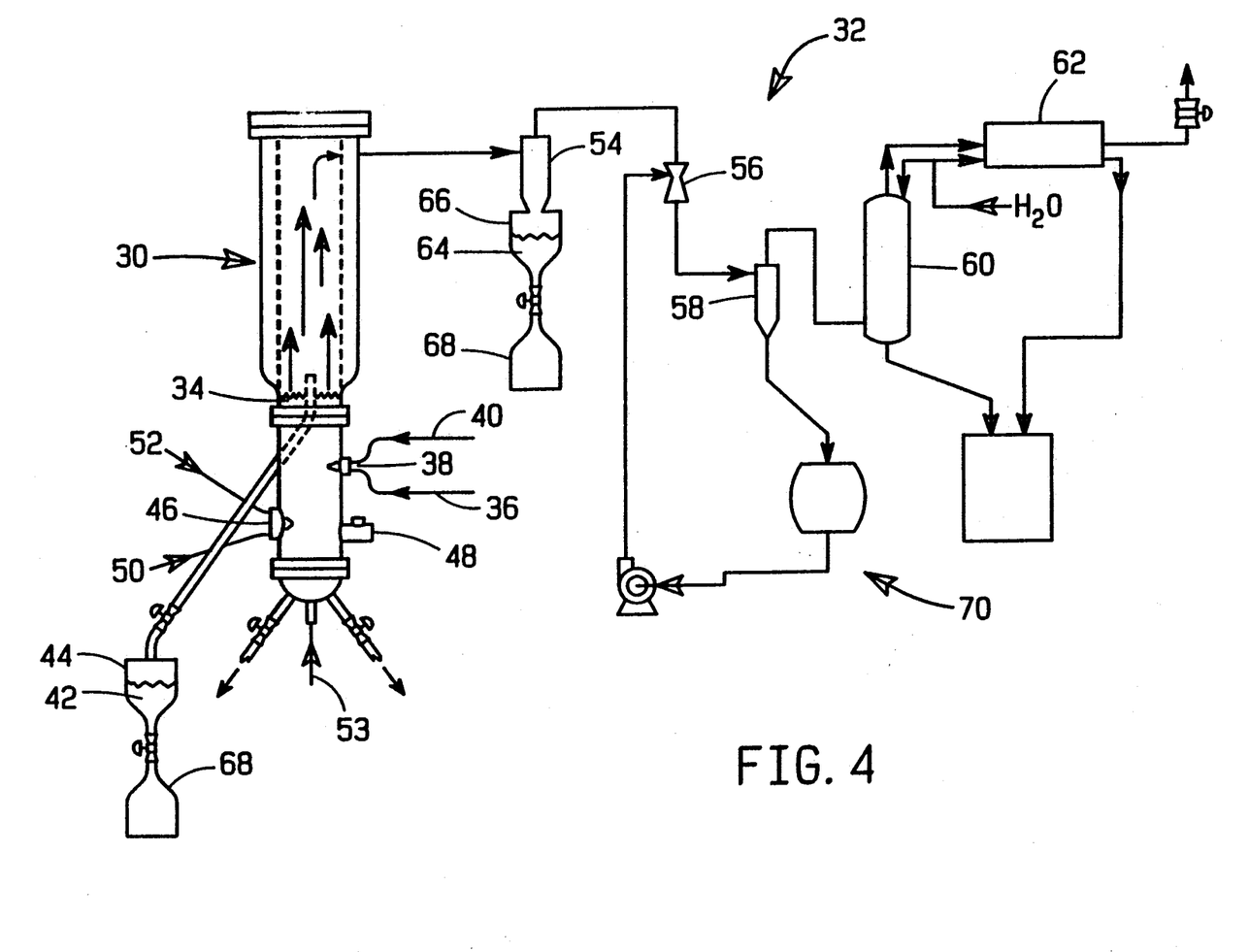
FIG. 4 is a schematic diagram of a fluidized-bed calciner apparatus.

The final calcining step 24 of FIG. 1 will be described by referring to the schematic diagram of the calcining pilot plant of FIG. 4. The apparatus used in this experiment consists of two basic parts: the 10 cm diameter calciner 30 and the gas scrubber system generally indicated at 32. The blended feed solution was sprayed into the calciner 30 fluidized-bed 34 via feed conduit 36. The waste feed nozzle 38 mixes air from the air pipe 40 with the feed from feed conduit 36 and the ratio of air-to-feed of the waste nozzle 38 controls the size of the calcine particles 42 collected at collection vessel 44. The calciner's fluidized-bed 34 was heated by in-bed combustion of kerosene at fuel nozzle 46. A propane burner 48 was used to raise the temperature inside the calciner 30 above the autoignition temperature of a kerosene-oxygen mixture. The kerosene enters nozzle 46 via fuel pipe 50 and the oxygen (O$_2$) via O$_2$ pipe 52. Fluidizing air that mixes the bed of feed enters the calciner at 53. The calcination temperature was about 500° C.

Off-gas leaving the 10-cm diameter calciner passed through the gas scrubber system 32 as follows: a primary cyclone 54 to remove fines, a venturi acid scrubber 56 containing 1 to 4M nitric acid for further fines removal, a secondary cyclone 58, and finally through two water-cooled condensers 60 and 62. Included with the off-gas leaving the calciner 30 are the calcined fines 64, the majority of which are collected in the fluidized-fines pot 66. The weight of fines and calcined particles may be weighed during the process by removal of weigh vessels 68.

The starting solution in the off-gas venturi acid scrubber system 70 was 4.0M nitric acid. Portions of acid scrub solution from the venturi scrubber system 70 were removed and replaced with new 4.0M nitric acid often enough to prevent the solution in the scrubber 56 from being neutralized and becoming thick with undissolved solids.

Compositions of the simulated fluorinel, Na, and complexed filter waste solution used in the run are previously given in Table I. The table also gives the theoretical composition of a blend of 4.85 vol. fluorinel waste—1 vol. Na waste—1.62 vol. complexed HEPA filter waste solution prior to calcium nitrate addition and the actual composition of the same blend (based on analyses) after calcium nitrate addition.

Feed samples were analyzed for major and minor constituents to determine if the feed had been prepared correctly (Table I). A sample from the acid solution in the carboy of used acid scrub, a sample from the condensate in each carboy of condensate collected, all caustic scrub samples, and solid samples taken at arbitrary intervals throughout the test runs were analyzed for those constituents that would determine the cadmium, chloride, fluoride, silicon, and sulfate behavior during the runs. Acid scrub was also analyzed for those constituents that would show if fluoride corrosion to materials of construction in the venturi acid scrub system would be excessive. Particles of the final fluidized-bed were examined by X-ray diffraction and emission spectroscopy. Calcined particulate and fines samples were analyzed for their nitrate content.

The following fluidized-bed characteristics were determined: (a) the mass mean particle diameter (MMPD) and bulk density for the product collected every 8 hours; (b) the attrition index (a measure of calcine particle hardness), MMPD, weight, and bulk density for the starting and final calcine fluidized-beds; (c) the attrition index for product taken during the middle part and at the end of the run; (d) bulk densities of fines collected every 8 hours; and (e) weights of product and fines removed from the calcine fluidized-bed.

Operating conditions are tabulated in Table II. Bed particle size growth was controlled between a MMPD of 0.5367 and 0.4803 mm by using an average feed nozzle-to-air ratio (NAR) of 1270 and an average fluidizing velocity of 0.27 m/s. Since the calcine did contain silicon compounds, controlling particle size might have been anticipated to be more difficult than it actually was. Apparently, the silicon content of the feed was too low to cause a noticeable difference in controlling particle size. However, this feed ratio was equivalent to calcining 36 2 ft ×2 ft ×1 ft HEPA filters per day—a significant number. NARs used in 10-cm calciner pilot plants are higher than those used in larger calciners; NAR ranges of 700 to 1300 are typical in a 10-cm calciner pilot plant.

TABLE II

OPERATING CONDITIONS FOR RUN

| | | |
|---|---|---|
| Acid scrub recycle to feed: | None | |
| Startup bed: | Calcined Zr/Na waste blend | |
| Feed nozzle: | Spraying Systems Co. 40100 liquid, 120 air | |
| Fuel nozzle: | Spray Systems Co. 2050 liquid, 67-6-20-70° air | |
| Calcination temperature - °C.: | *503 | +7 / −10 |
| Waste fee rate - l/h: | 1.99 | +0.21 / −0.54 |
| Fluidizing air rate - l/s: | 0.82 | +0.06 / −0.04 |
| Fluidizing velocity (below nozzle) - m/s: | 0.27 | +0.00 / −0.01 |
| Feed atomizing air nozzle pressure - psig: | 27 | +8 / −7 |
| Feed atomizing air rate - l/s: | 0.68 | +0.09 / −0.05 |
| Fuel nozzle atomizing $O_2$ rate - l/s: | 0.38 | +0.00 / −0.01 |
| Fuel nozzle $O_2$/fuel ratio: | 2,171 | +189 / −212 |
| Kerosene feed rate - l/h: | 0.63 ± 0.05 | |
| Waste NAR: | 1270 | +630 / −295 |
| Bed turnover - %: | 96.7 | |
| Duration of run - hours: | 39.81 | |

*The three numbers given represent the average, maximum, and minimum values.

Table III lists the important data obtained on fluidized-bed operation and properties of the calcined fluidized-bed solids generated during the run.

The product production rate (370 g/h) and the product-to-fines ratio (8:1) for the run were sufficiently high to indicate that building a fluidizing bed and maintaining bed height would be no problem. Bulk density of product was high (1.64 g/cm$^3$) indicating particle size should be kept small to produce good bed fluidization. Product attrition indices were high (~70%). Product production rates, the product-to-fines ratio, the product bulk densities, and product attrition indices for the run are about the same as those obtained from enclosed 10-cm calciner pilot plant runs calcining blends of simulated Na and fluorinel wastes without the complexed dissolved HEPA filter solution. Thus, the product production rate, product-to-fines ratio, product bulk density, and product attrition index of solids formed during calcination of a blend of fluorinel and Na waste are independent of whether the blend contains the complexed HEPA filter solution or not.

In enclosed 30-cm diameter calciner pilot plant runs calcining simulated blends of fluorinel and Na wastes, the nitrate content of fines varied between 6.9 and wt % while the nitrate content of product has varied between 5.7 and 10.3 wt %. The average nitrate content of calcined product produced from this run was 9.7 wt %; the average nitrate content of fines produced from this run was 9.2 wt % indicating that there is no significant difference between the calcine product and fines generated from this run when compared to previous runs and, therefore, the silicon from the filters does not affect the nitrate concentration of the calcine product and fines. An excess nitrate can cause clumping in the calcine furnace.

A calcined particulate retrieval test was performed on a homogenous mixture of calcined product and calcined fines collected during the latter part of the run. The product and fines mixture used for the run was mixed in the same weight ratio as the run's product-to-fines ratio (8:1) shown in Table III. A retrieval test consisted in attempting (several times) to retrieve a mixture of product and fines from a can that had been subjected to a temperature of 650° C. and a pressure of 8.7 psig for three days using a vacuum nozzle without and with vibrator assistance. The average loading rate obtained in removing this run of calcined solids from the can was 2.1 kg of calcine per kg of vacuum air using a nozzle without vibrator assistance and 6.9 kg of calcined solids per kg of vacuum air using a nozzle with vibrator assistance. During retrieval tests, a loading rate of 1.5 kg of calcined solids per kg of vacuum air is considered satisfactory. Thus, the loading rate obtained on calcined solids from this run was satisfactory.

TABLE III

CHARACTERISTICS OF FLUIDIZED-BED AND SOLIDS PRODUCED DURING RUN

| | | |
|---|---|---|
| Product: | | |
| Production rate (g/h) | 370 | |
| Bulk density (g/cm$^3$) | 1.641 | +0.096$^{(a)}$ / −0.103 |
| Particle density (g/cm$^3$) | 2.61 ± 0.08 | |
| MMPD (mm) | 0.4989 | +0.0108 / −0.0186 |
| Attrition index of −40 + 50 mesh fraction (%) | | |
| at COT 24.00 h | 69.4 | |
| at COT 39.81 h | 67.8 | |
| Nitrate content (wt %) | 9.73 | +1.17 / −0.77 |
| Fines: | | |
| Production rate (g/h) | 45.8 | |
| Bulk density (g/cm$^3$) | 0.558 | +0.041 / −0.029 |
| Nitrate content (wt %) | 9.16 | +1.44 / −1.38 |
| Product-to-Fines Ratio: | 8.1 | |
| Starting Bed: | | |
| MMPD (mm) | 0.5367 | |
| Bulk density (g/cm3) | 1.521 | |
| Attrition index of −40 + 50 mesh fraction (%) | 73 | |
| Final Bed: | | |
| MMPD (mm) | 0.5951 | |
| Bulk density (g/cm$^3$) | 1.613 | |
| Attrition index of −40 + 50 mesh fraction (%) | 70.8 | |
| Wt % of bed that was +16 mesh particles$^{(b)}$ | 3.9 | |
| Wt % of bed that was +¼ inch diameter agglomerates$^{(b)}$ | 0.16 | |

$^{(a)}$The three numbers represent the average, maximum and minimum values.
$^{(b)}$Does not include particles hung up inside calciner (these particles were 3.0 wt % of final bed).

During the run, there was enough calcium in the off-gas acid scrub solution to combine with all the fluoride present; 0.18 wt % of the fluoride fed to the calciner escaped the acid scrubber uncombined with calcium as CaF$_2$. Thus, 0.18 wt % of the fluoride fed to the calciner was probably present in calciner off-gas as volatile fluoride not entrained in fines. Fluoride volatility (fluoride in off-gas not complexed as CaF$_2$) from the calciner vessel during pilot-plant calciner runs has been considered acceptable when it equals 1.0 wt % or less. The small amount of fluoride volatility suggests not much unwanted volatile "SiF$_4$"0 was formed. With a material balance of 110 wt % (the sum of the silicon concentrations found in the calciner streams+amount of silicon in the feed ×100), the average percent of the total silicon staying in calcined solids was 97.0. If it is assumed that one mole of silicon in the acid scrub solution will complex 4 to 6 moles of fluoride, the concentrations of silicon, boron, zirconium, and aluminum dissolved by the acid scrub solution from fine removal is sufficient to complex any volatile fluoride and thus prevent excessive corrosion to materials of construction in calcining facility acid scrub system.

Values summarizing the behavior of chloride in the run are given in Table IV. Chloride retention in calcined solids was lower than is normal during calcination of blends of fluorinel and Na wastes, average 65.4 wt % of the total found in calciner streams. The average chloride retention in calcined solids during calcination of blends of fluorinel and Na wastes (without HEPA filter solution) in the larger 30-cm pilot-plant calciner runs was 92.4 wt % of the total found. As previously stated, HEPA filters contain aromatic polyamides called aramids, which contain chloride in a form that can be converted from the solid to the gaseous state without decomposition when heated. Since the filters used in this particular test run had not been baked to remove Kevlar TM, the volatilization of these chlorides during this calcination probably caused this chloride volatility that was higher than normally experienced during calcination of fluorinel and Na wastes. The chloride volatility can be eliminated as previously demonstrated by baking the filters prior to the calcining process. Lower chlorides in the off-gas system are desirable to reduce corrosion of the system.

TABLE IV

CHLORIDE BEHAVIOR IN CALCINED SOLIDS DURING RUN

| CALCINER STREAM | AVERAGE WT % OF TOTAL[a] CHLORIDE FOUND IN CALCINER STREAMS |
|---|---|
| Total calcined solids[b] | 65.4 |
| Calcined product | 51.9 |
| Calcined fines | 13.5 |
| Acid scrub | 20.0 |
| Off-gas leaving acid scrub[c] | 14.6 |

[a]Percent of total found in calcine solids, acid scrub, and caustic scrub.
[b]Fines plus product.
[c]Based on concentration found in caustic scrub solution located downstream from the acid scrubber.

It is desirable to have a low content of sulfate in the off-gas system to again reduce production of acids, i.e., $H_2SO_4$, which are corrosive to the system. Only 2.8 wt % of the sulfate fed to the calciner escaped the calciner in the off-gas; 1.6 wt % of the sulfate fed to the calciner was found in the acid scrub; and 1.2% was found in the caustic scrub solution. This is the same sulfate volatility found in an unenclosed 30-cm calciner run calcining a blend of zirconium and sodium wastes where 1.6 wt % of the sulfate fed to the calciner was found in the acid scrub solution and 1.1% was found in the caustic scrub solution.

The final bed produced in the run was examined by two methods: X-ray diffraction and by emission spectroscopy. X-ray diffraction showed: (a) $CaF_2$ and $Ca_{0.15}Zr_{0.85}O_{1.85}$ to be major constituents; (b) CdO, NaCl, $CdSO_4$, and $CaCO_3$ to be possible minor constituents; (c) that an unidentified minor constituent may be present; and (d) that amorphous material is present. Emission spectroscopy showed that the final bed contained: (a) Cd, Ca, Zr, and Al as major constituents ($\geq 5$ wt %); (b) Na, Cr, Si, and Mg as minor constituents ($<5\% \geq 0.1$ wt %); and (c) B, Ni, Fe, and Mn as trace constituents ($<0.1$ wt %).

The following conclusions were reached based on results presented above.

A. Pilot plant run was voluntarily terminated after 39.81 hours of run time (96.7% bed turnover). The feed for the run was a blend of 1.0 vol. complexed filter waste (see Table I), a 1.62 vol. simulated Na waste, and a 4.85 vol. simulated fluorinel waste containing a calcium-to-fluoride mole ratio of 0.70 and an aluminum-to-alkali metals mole ratio of 2.9 while producing calcine containing 3.6 mole % alkali metals. The blend and feed rate used in the run was equivalent to about 36 filters/day being dissolved and calcined.

B. Particle size was controlled at an average feed nozzle air-to-feed ratio of 1270 (1000 to 1300 are not unusually high in the calciner used) and an average fluidizing velocity of 0.27 m/s (average for the calciner used).

C. The product production rate, product-to-fines ratio, product bulk density, product attrition index, and nitrate content of solids formed during the calcination of a blend of fluorinel and Na waste was unaffected by addition of the baked and complexed HEPA filter solution.

D. Fluoride volatility suppression was satisfactory during the run. Only 0.18 wt % of the fluoride fed to the calciner vessel was volatilized from the vessel in a form other than as $CaF_2$ ($CaF_2$ escapes the calciner entrained in the fines). The concentration of silicon, boron, zirconium, and aluminum in the acid scrub solution is sufficient to prevent excessive corrosion to materials of construction.

E. The presence of complexed HEPA filter solution in blends of fluorinel and Na waste does not affect sulfate or cadmium volatility from the calciner vessel adversely.

F. The process is optimized by mixing the blended feed solution to have a maximum ratio of sodium waste-to-fluorinel waste and HF/filter solution of about 1:4 and a maximum ratio of HF/filter solution-to-fluorinel of about 1:5.5.

G. An overall waste volume reduction ratio of at least 15:1 is accomplished by this hydrofluoric acid dissolution process.

While a preferred embodiment of the invention has been disclosed, various modes of carrying out the principles disclosed herein are contemplated as being within the scope of the following claims. Therefore, it is understood that the scope of the invention is not to be limited except as otherwise set forth in the claims.

What is claimed is:

1. A process for reducing the volume of a contaminated HEPA filter comprising dissolving the HEPA filter media in hydrofluoric acid solution of a strength required to have a minimal amount of free hydrofluoric acid at the end of the dissolution to provide that filter dissolution is complete, silica gel ($SiO_2$) is minimized, and silicon fluoride ($SiF_4$) is maximized.

2. The process of claim wherein the dissolution chemical reaction equations are:

3. The process of claim 2 wherein free HF at the end of the dissolution is less than 0.1M.

4. The process of claim 3 further includes complexing the excess HF leftover from the dissolution step with aluminum nitrite ($AlNO_3$) solution to form water soluble aluminum fluoride salts.

5. The process of claim 4 wherein the fluoride-to-silicon ratio is 7:1 to provide water soluble aluminum fluoride salts.

6. The process according to claim 4 wherein the complexing chemical reaction is:

$$Al(NO_3)_3 + nHF \rightarrow AlF_n^{+3-n} + nHNO_3.$$

7. The process of claim 1 further includes baking the HEPA filter at 550° C. for a minimum of 3 hours, previous to the dissolution step, to sublimate any Kevlar ™ reinforcement material that may be present in the filter.

8. The process of claim 4 further includes mixing the dissolved and complexed HEPA filter solution with both sodium and fluorinel waste to provide a ratio of HEPA filter solution and fluorinel waste:sodium waste of 4:1.

9. A process for dissolving and calcining a radioactive contaminated HEPA filter comprising:
  a. baking the HEPA filter;
  b. dissolving the HEPA filter media in a hydrofluoric (HF) acid solution of a strength required to minimize formation of both silica gel and precipitates, forming an HF/filter solution;
  c. complexing the HF/filter solution with an aluminum nitrate ($AlNO_3$) solution forming a complexed filter waste solution;
  d. mixing the complexed filter waste solution with a radioactive solution forming a complexed filter/radioactive waste solution;
  e. performing a second complexing on the complexed filter/radioactive waste solution by addition of calcium nitrate ($Ca(NO_3)_2$), forming a blended feed solution; and then
  f. calcining the blended feed solution, thereby forming a calcined particulate and fines.

10. The process as recited in claim 9 wherein a baking temperature is about 550° C. and a baking period is about 3 hours.

11. The process as recited in claim 9 wherein the hydrofluoric acid concentration is at a maximum of 2 molar solution and an amount of HF solution is added to obtain a molar ratio of fluoride/silicon of about 7:1.

12. The process as recited in claim 11 wherein an amount of 2.2 molar $AlNO_3$ solution is added for complexing the HF/filter solution to obtain a fluoride-to-aluminum molar ratio of between 20:1 and 40:1.

13. The process as recited in claim 12 and wherein the radioactive waste comprises a mixture of fluorinel and a sodium waste.

14. The process as recited in claim 13 wherein an amount of calcium nitrate is added to the complexed filter/radioactive waste solution to obtain the blended feed solution having a calcium-to-fluoride molar ratio of about 0.70:1.

15. The process as recited in claim 14 wherein the blended feed solution has a maximum ratio of sodium waste-to-fluorinel waste and HF/filter solution of about 1:4 and a maximum ratio of HF/filter solution-to-fluorinel of about 1:5.5.

16. The process as recited in claim 11 wherein the filter dissolution is in the hydrofluoric acid at a temperature of about 70° C. for about 1 hour and then in HF acid at 25° C. for about 12 hours.

17. A process for dissolving and calcining a radioactive contaminated HEPA filter comprising:
  a. baking the HEPA filter;
  b. dissolving the HEPA filter media in a hydrofluoric (HF) acid solution in an amount that gives a molar ratio of fluoride-to-silicon of about 7:1, forming an HF/filter solution;
  c. complexing the HF/filter solution with an aluminum nitrate ($AlNO_3$) solution forming a complexed filter waste solution;
  d. mixing the complexed filter waste solution with a radioactive solution forming a complexed filter/radioactive waste solution;
  e. performing a second complexing on the complexed filter/radioactive waste solution by addition of calcium nitrate ($Ca(NO_3)_2$), forming a blended feed solution; and then
  f. calcining the blended feed solution, thereby forming a calcined particulate and fines.

18. The process as recited in claim 17 wherein a baking temperature is about 550° C. and a baking period is about 3 hours.

19. The process as recited in claim 17 wherein the hydrofluoric acid concentration is at a maximum of 2 molar solution.

20. The process as recited in claim 19 wherein an amount of 2.2 molar $AlNO_3$ solution is added for complexing the HF/filter solution in order to obtain a fluoride-to-aluminum molar ratio of between 20:1 to 40:1.

21. The process as recited in claim 20 wherein an amount of $Ca(NO_3)_2$ is added to the complexed filter/radioactive waste solution to obtain a blended feed solution having a calcium-to-fluoride molar ratio of about 0.70:1.

22. The process as recited in claim 21 wherein the blended feed solution has a maximum ratio of sodium waste-to-fluorinel waste and HF/filter solution of about 1:4 and a maximum ratio of HF/filter solution-to-fluorinel of about 1:5.5.

23. A process for dissolving and calcining a radioactive contaminated HEPA filter comprising:
  a. baking the HEPA filter at about 550° C. for about 3 hours;
  b. dissolving the HEPA filter media in a hydrofluoric (HF) acid solution in an amount that gives a molar ratio of fluoride-to-silicon of about 7:1, forming an HF/filter solution;
  c. complexing the HF/filter solution with an amount of 2.2 molar aluminum nitrate ($AlNO_3$) solution that gives a fluoride-to-aluminum molar ratio of between 20:1 and 40:1, forming a complexed filter waste solution;
  d. mixing the complexed filter waste solution with a radioactive solution forming a complexed filter/radioactive waste solution;
  e. performing a second complexing on the complexed filter/radioactive waste solution by addition of an amount of calcium nitrate ($Ca(NO_3)_2$), to obtain a calcium-to-fluoride molar ratio of about 0.7:1, forming a blended feed solution; and then
  f. calcining the blended feed solution, thereby forming a calcined particulate and fines.

24. The process as recited in claim 23 wherein the filter dissolution is in the hydrofluoric acid at a temperature of about 70° C. for about 1 hour and then in HF acid at 25° C. for about 12 hours.

25. The process as recited in claim 24 wherein the blended feed solution has a maximum ratio of sodium waste-to-fluorinel and HF/filter solution of about 1:4 and a maximum ratio of HF/filter solution-to-fluorinel of about 1:5.5.

26. The process as recited in claim 25 wherein the overall HEPA waste volume reduction ratio is about 15:1.

* * * * *